(12) United States Patent

Schellenberger

(10) Patent No.: US 12,674,521 B2

(45) Date of Patent: Jul. 7, 2026

(54) MODULAR DRIVE SYSTEM WITH VALVE DRIVE MODULES FOR ASSEMBLING A VALVE DRIVE SYSTEM

(71) Applicant: Helmut Baelz GmbH, Heilbronn (DE)

(72) Inventor: Tobias Schellenberger, Kirchardt-Berwangen (DE)

(73) Assignee: HELMUT BAELZ GMBH, Heilbronn (DE)

( * ) Notice: Subject to any disclaimer, the term of this patent is extended or adjusted under 35 U.S.C. 154(b) by 0 days.

(21) Appl. No.: 18/759,800

(22) Filed: Jun. 28, 2024

(65) Prior Publication Data

US 2025/0003516 A1 Jan. 2, 2025

(30) Foreign Application Priority Data

Jun. 29, 2023 (DE) ..................... 10 2023 117 127.5

(51) Int. Cl.
F16K 31/04 (2006.01)

(52) U.S. Cl.
CPC .................................. F16K 31/043 (2013.01)

(58) Field of Classification Search
None
See application file for complete search history.

(56) References Cited

U.S. PATENT DOCUMENTS 2,429,313 A * 10/1947 Gilbert ...................... F02D 9/00
267/156
2,941,415 A * 6/1960 Hawkins ................. F16H 57/12
74/432

(Continued)

FOREIGN PATENT DOCUMENTS

DE 9402093 U1 3/1994
DE 4447309 A1 7/1996

(Continued)

OTHER PUBLICATIONS

European Search Report for EP Application No. 24166378.0; Issue Date, Sep. 13, 2024.

(Continued)

*Primary Examiner* — Matthew W Jellett

(74) *Attorney, Agent, or Firm* — CANTOR COLBURN LLP

(57) ABSTRACT

The modular drive system according to the present disclosure, including valve drive modules is used for assembling a valve drive system. The valve drive modules of the modular drive system according to the present disclosure can be variably connected to one another via their module interfaces to form a valve drive system. The module housings of the valve drive modules contain the respective functional units separately from one another, which simplifies the assembly. The modular drive system according to the present disclosure includes comprises an electric drive module with an drive module housing, on the bottom of which a module interface is arranged; and a drive module which can be attached to a valve and which is configured to convert the input-side rotary movement into an output-side movement with which the valve can be actuated, wherein the valve drive modules can be connected to one another via their module interfaces to form a valve drive system.

19 Claims, 7 Drawing Sheets

(56)                References Cited

U.S. PATENT DOCUMENTS

| | | | | |
|---|---|---|---|---|
| 3,028,726 | A * | 4/1962 | Jenkins | F16K 31/046 |
| | | | | 60/709 |
| 4,705,061 | A * | 11/1987 | Mueller | F16K 31/05 |
| | | | | 474/135 |
| 5,386,761 | A * | 2/1995 | Holtgraver | F15B 15/125 |
| | | | | 251/59 |
| 5,853,022 | A * | 12/1998 | Eggleston | F16K 31/1228 |
| | | | | 251/62 |
| 6,015,142 | A * | 1/2000 | Ulicny | F16K 31/047 |
| | | | | 267/155 |
| 6,240,941 | B1 * | 6/2001 | Small | F16K 27/003 |
| | | | | 137/595 |
| 6,742,765 | B2 * | 6/2004 | Takano | F16K 31/047 |
| | | | | 251/292 |
| 7,128,191 | B2 * | 10/2006 | Fisher | E05B 81/50 |
| | | | | 267/155 |
| 8,118,276 | B2 * | 2/2012 | Sanders | G05B 19/39 |
| | | | | 137/554 |
| 8,960,219 | B2 * | 2/2015 | Andersen | F16K 31/122 |
| | | | | 251/63.5 |
| 10,197,141 | B2 | 2/2019 | Armstrong | |
| 10,859,146 | B2 * | 12/2020 | Bracey | F17C 13/04 |
| 2017/0138154 | A1 * | 5/2017 | Burdick | E21B 43/12 |
| 2021/0230966 | A1 | 7/2021 | Dietrich et al. | |

FOREIGN PATENT DOCUMENTS

| | | |
|---|---|---|
| EP | 0667472 A2 | 8/1995 |
| EP | 2992257 B1 | 6/2021 |
| WO | 2007135721 A1 | 11/2007 |
| WO | 2014135274 A2 | 9/2014 |

OTHER PUBLICATIONS

German Office Action corresponding to DE Application No. 10 2023 117 127.5; Mailing Date, Jun. 6, 2024.

* cited by examiner

MODULAR DRIVE SYSTEM WITH VALVE DRIVE MODULES FOR ASSEMBLING A VALVE DRIVE SYSTEM

CROSS REFERENCE TO RELATED APPLICATIONS

This application claims priority under 35 U.S.C. § 119 to the following German Patent Application No. 10 2023 117 127.5, filed on Jun. 29, 2023, the entire contents of which are incorporated herein by reference thereto.

TECHNICAL FIELD

The present disclosure generally relates to valve drive systems with modules which can be assembled and mounted to form a valve actuator, as well as modular drive systems for a valve drive.

BACKGROUND

Electric drives for valves are generally known. In the field of plant engineering, valves refer to components for changing and controlling substance flows, which are used in particular on pipelines and containers (such as vessels) for gases and liquids. Valves can be designed as valves, flaps, ball valves or gate valves, for example. Valve drives can be used to operate the valves in such a way that the flow through the valve can be adjusted. In safety-critical applications, in particular closing devices or fail-safe devices are used to bring the valves into a safe position in an emergency, for example in the event of a power failure or failure of the drive.

U.S. Pat. No. 10,197,141 B2 describes an electric actuator for valves that is equipped with a fail-safe device for the event of a power failure. The fail-safe device in the actuator can be activated, for example, if a power failure or other external incorrect operation of the actuator occurs such that the valve is moved to a predetermined position without an external power supply. A spring is conventionally used to move the valve to a predetermined position.

EP 2 992 257 B1 describes a valve closing device with an output shaft for normal operation and an emergency drive, wherein the output shaft can also be moved from an operating position to an end position by the emergency drive. The emergency actuator is configured as a roller spring motor and is coupled to the output shaft via a transmission shaft.

However, the valve actuators or valve drives with closing devices or fail-safe devices described in the prior art are configured as complete systems in which all system components, such as transmission, actuator, and spring, are firmly enclosed in one unit. Subsequent modification, adaptation, maintenance or replacement of individual components of this complete system is therefore complex.

BRIEF SUMMARY

Based on this, it is the problem of the present disclosure to provide a modular drive system for valves, with which a variable assembly and mounting of a valve actuator is enabled.

This problem is solved by the modular drive system comprising valve drive modules for assembling and mounting a valve drive system.

A Modular drive system including valve drive modules for assembling a valve drive system, including: an electric drive module with a drive module housing, on a bottom of which a module interface is arranged; an actuating module which is attachable to a valve and is configured to convert an input-side rotary movement into an outside movement with which the valve can be actuated, wherein the valve drive modules are connectable to one another via module interfaces of the valve drive modules to form a valve drive system.

The modular drive system according to the present disclosure comprises an electric drive module with a drive module housing, on the bottom of which a module interface is arranged, and an actuating module with an actuating module housing which is attachable to a valve, on the top of which a module interface is arranged, the actuating module being configured to convert an input-side rotary movement into an output-side movement with which the valve can be actuated. Actuating the valve is preferably understood to mean adjusting the flow rate through the valve. Actuating the valve can comprise opening and closing the valve, wherein all intermediate positions between (fully) open and (fully) closed can be included.

The valve drive modules of the modular drive system according to the present disclosure can be (freely) connected to each other via their module interfaces forming a valve drive system, which enables the assembly and mounting of a valve drive system from the valve drive modules of the modular drive system in such a way that the assembled valve drive system can be adapted to the requirements placed on the valve drive system by the already installed valve. The respective functional units are enclosed separately from each other in the module housings of the valve drive modules. The dimensions of the module housings and the module interfaces attached to the upper and bottoms can preferably be at least essentially the same, which can simplify the assembly. In particular, the functional units in the valve drive modules are at least partially, preferably completely, enclosed by the housings, wherein save handling during assembly and operation of the valve drive system can be ensured.

In particular, the modular drive system comprises at least one spring module with a spring module housing, on the upper and bottoms of which module interfaces are arranged. Preferably, the modular drive system comprises several spring modules which have uniform spring elements, wherein the individual spring modules can be combined with one another. The spring module housings of the individual spring modules preferably have an identical configuration and can be stacked in such a way that the spring torques of the spring modules add up. The spring elements can be preloaded during assembly, wherein the value of the spring torque output depends on the preload. The spring torques and the spring modules lie within a value range that is limited by a maximum spring torque. The spring torques of the spring modules are preferably turnable, so that the effective direction of the spring torques (e.g. counterclockwise) can point in the opposite effective direction (e.g. clockwise) after turning. According to the modular concept of the present disclosure, which is implemented by the modular drive system, the modular drive system can also be configured without a spring module, as described above.

A special aspect of the modular drive system according to the present disclosure is that the respective valve drive modules comprise separate, interconnectable and functionally couplable housings, so that the assembly, modification, replacement and reassembly of the individual valve drive modules is as simple as possible and possible on site (i.e. at the installation site) or, for example, also when retrovalve a system or maintaining an existing valve drive system. In particular, the valve drive modules also have shaft couplings by means of which the valve drive modules can be functionally coupled together to form a valve drive system.

The module interfaces are configured to connect the module housings of the individual valve drive modules to one another. Preferably, the module interfaces are arranged on the upper and lower sides of the module housings so that the module housings of the valve drive modules can be stacked on top of each other, with the module interfaces enabling concealed screw connection. For example, the module interfaces have one or more through holes and one or more thread holes so that the module housings can be connected to each other with threaded screws that match the threaded holes without having to dismantle the module housings during assembly. The threaded screws are also not visible from the outside (concealed). The shaft of the threaded screws can be inserted without the through holes of the valve drive module and engaged with the threaded hole of another drive module below or above it, so that the threaded screw fastens one valve drive module against the other valve drive module. For this, the lower valve drive module is rotated by a certain angle, e.g. 90°, in relation to the upper valve drive module. The head of the threaded screw is preferably countersunk so that it is flush with the bottom of the housing so that the head of the threaded screw does not protrude from the bottom.

Preferably, the valve drive modules each have shaft couplings with which the shafts of the individual valve drive modules can be coupled to one another, whereby the valve drive modules can be functionally coupled to one another.

In particular, the module interfaces of the spring module can be selectively connected to the module interfaces of other spring modules or the module interfaces of the other valve drive modules. This allows the overall structure of the assembled valve drive system to be (freely) assembled.

Preferably, the modular valve drive system comprises a plurality of spring modules, whose spring module housings enclose a spring element house therein, which can reduce the risk of injury when assembling the valve actuator. The spring element is configured as a roller spring, for example.

It is preferred that the at least one spring module comprises a connecting shaft, wherein the spring element is configured to allow a spring torque to act on the connecting shaft when it is preloaded against a spring direction. In an emergency situation, such as a power failure or failure of the drive module, the spring torque can ensure that the valve is brought into a safety position (e.g. closed or open) due to the spring torque.

In particular, the modular drive system has uniformly defined (maximum) spring torques, which can be stacked in such a way that the spring torques act parallel to each other on the input shaft of the drive module. By stacking several spring modules, the spring characteristics of the actuator system can be changed. In the event that the installed valve requires, for example, that a greater closing torque acts on the actuator in order to bring it into the fail-safe position, several spring modules can be stacked.

Preferably, the module interfaces arranged on the bottoms of the spring modules can be connected to the module interfaces arranged on the bottoms of the other valve drive modules of the modular system and, correspondingly, the module interfaces arranged on the tops of the spring modules can be connected to the module interfaces arranged on the tops of the other valve drive modules of the modular system in such a way that the spring modules are installed upside down (i.e. turned). This allows the spring modules to be turned around, wherein the direction in which the spring torques act on the input shaft of the drive module can be reversed. After reversal, the spring torques point in the opposite direction. For example, the spring torques of the spring modules can act in a right turning direction (clockwise) in the preloaded state if the tops of the spring modules are arranged at the top. If, on the other hand, the tops of the spring modules are arranged at the bottom, the spring torques of the spring modules act in a left turning direction (counterclockwise) in the preloaded state. Thus, depending on whether the safety position of the valve is the closed or the open position, the valve drive system can be adapted to the existing valve.

Preferably, the module interfaces of the valve drive modules comprise through holes that extend from the top to the bottom of the module housings. In particular, the module interfaces of the valve drive modules comprise threaded holes that are arranged on the top and bottom of the valve housings.

In particular, the modular drive system further comprises a rotary transmission module with a rotary transmission module housing, on the top and bottom of which module interfaces are arranged, wherein the rotary transmission module is configured to convert an input-side rotary movement into an output-side rotary movement, wherein preferably the output-side rotary movement is geared down or geared up relative to the input-side rotary movement. For example, a rotary movement of an drive module can be reduced in this way in order to increase the transmitted torque of the rotary movement. This is, in particular, advantageous for other types of valves, such as rotary valves, butterfly valves and the like without a linear drive module, in which a comparatively high torque is required to control the actuator.

The drive modules of the modular drive system can have a linear drive module with a linear drive module housing, on the top of which a module interface is arranged, the linear drive module being configured to convert an input-side rotary movement into an output-side linear movement with which the valve is actuated. In addition, the drive modules of the modular drive system can have a swivel module with a swivel module housing, on the top of which a module interface is arranged, whereby the swivel module is configured to convert an input-side rotary movement into an output-side swivel movement for actuating the valve. In this way, the modular drive system can be used to assemble and build valve drive systems that can be mounted on different types of valves (such as valves, butterfly valves, ball valves, gate valves and the like).

It is preferred that the dimensions and arrangements of the module interfaces provided on the upper and lower sides of the housings of the valve drive modules are adapted to each other in such a way that they can selectively be connected to each other.

Furthermore, the problem of the present disclosure is solved by the valve drive system according to claim 15:

The valve drive system according to the present disclosure is assembled from several valve drive modules of the modular drive system of the above type.

All the features and advantages described in relation to the modular drive system according to the present disclosure, in particular in relation to the individual valve drive modules, are also applicable to the valve drive system.

BRIEF DESCRIPTION OF THE DRAWINGS

Further details of advantageous embodiments or details of the present disclosure can be gathered from the drawings, the description and the sub-claims. The Figured show the following:

DETAILED DESCRIPTION

FIGS. 1, 2 and 3A to 3C illustrate several valve drive systems 10, 10', 10" for different valves 11, 11', 11", wherein the valve drive systems 10, 10', 10" are constructed from several valve drive modules 12, 13, 14, 15, 16 of the modular drive system.

Figure 1:
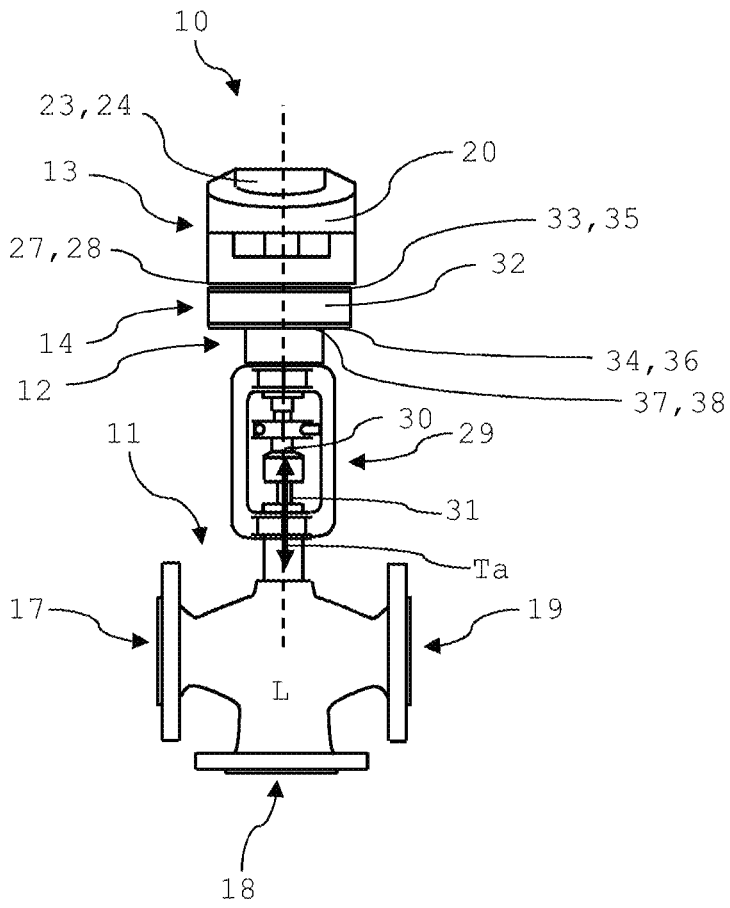
FIG. 1 is a schematic view of an example of a valve drive system, which is assembled from valve drive modules of the modular drive system.

In FIG. 1, the valve 11 is designed as a 3-way valve with an A inlet 17, a B inlet 18 and an AB outlet 19.

The valve drive system 10 shown in FIG. 1 comprises a drive module 13 with a drive module housing 20, a (module-internal) actuator motor 21, a (module-internal) controller 22, an operating unit 24 arranged on the top 23 of the drive module 13, a (module-internal) rotary transmission 25 and a shaft coupling 26 of the drive module 13, wherein the drive module 13 is configured to provide an output rotary movement Ra about the longitudinal axis L from the drive module 13 at its shaft coupling 26. A module interface 28 of the drive module 13 is arranged on the bottom 27 of the drive module housing 20, by means of which the drive module housing 20 can be connected to the other valve drive modules of the modular drive system. The module-internal components of the drive module 13 are illustrated in detail in FIG. 4.

A stand module 29 for the valve drive system 10 is arranged on a top of the valve 11, with which a linear drive module 12 can be fastened to the valve 11 in such a way that a coupling 30 of the linear drive module 12 can transmit its (output-side) stroke movement Ta to a valve spindle 31 of the valve 11.

A spring module 14 with its own spring module housing 32 is mounted between the linear drive module 12 and the drive module 13 in FIG. 1. On a top 33 and on a bottom 34 of the spring module housing 32, the latter has in each case a module interface 35, 36, which are configured to be connected to the module interfaces 28, 35, 36, 38 of the other valve drive modules 11, 12, 13, 14, 15. In the example shown in FIG. 1, the module interface 35 arranged on the top 33 of the spring module housing 32 is connected to the module interface 28 arranged on the bottom 27 of the drive module housing 20 and the module interface 36 arranged on the bottom 34 of the spring actuator housing 32 is connected to the module interface 38 of the linear transmission module 12. The module interface 36 arranged on the bottom 34 of the spring module housing 32 is connected to the module interface 38 arranged on the top 37 of the linear drive module 12.

The modular drive system according to the present disclosure can comprise various linear drive modules 12, which are adapted to different types of valves 11, 11', 11".

Figure 2:
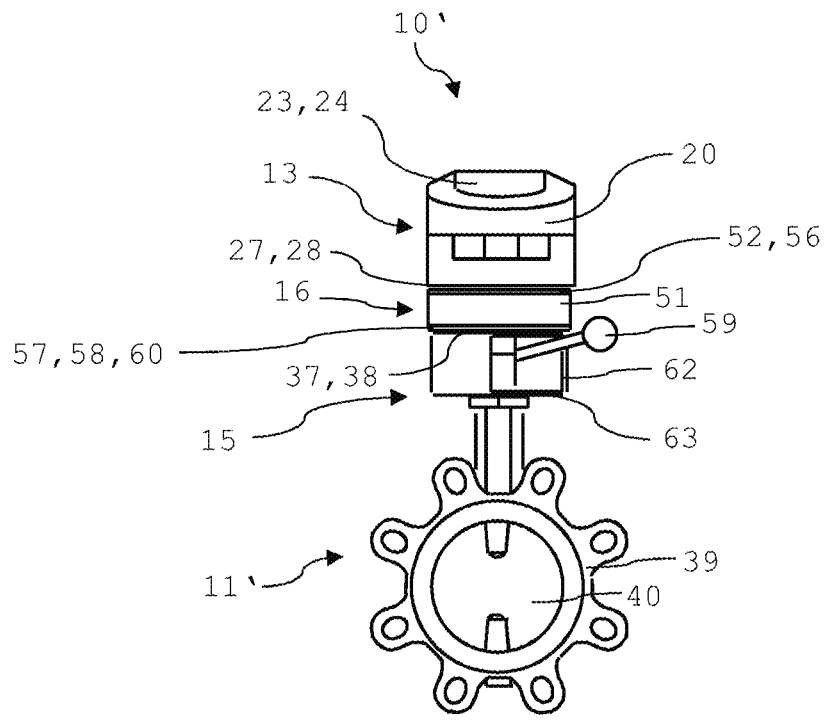
FIG. 2 is a schematic view of a further example of a valve drive system, which is constructed from valve drive modules of the modular drive system.

FIG. 2 shows a further example of a valve drive system 10', which has a drive module 13 and a rotary drive module 16 and a swivel module 62. The swivel module 62 shown has a hand lever 59. Alternatively, the swivel module 62 can also have no hand lever 59. The swivel module 62 is configured to convert an input rotary movement into a swivel movement. A rotary transmission module 15 with a rotary transmission module housing is mounted between the swivel module 62 and the drive module 13, which converts the torque of the drive module 12 applied on the input side into a higher torque. On the top 60 of the swivel module 62, the swivel module 62 has a module interface 58, which is connected to the module interface 58 of the rotary transmission module 15 arranged on the bottom 57. On the bottom 63 of the swivel module, it has a swivel module interface which is connected to a module interface of the valve 11'. In this example, the valve 11' is designed as a flap. The flap has a flap housing 39 with a flap disk 40.

Figure 3A:
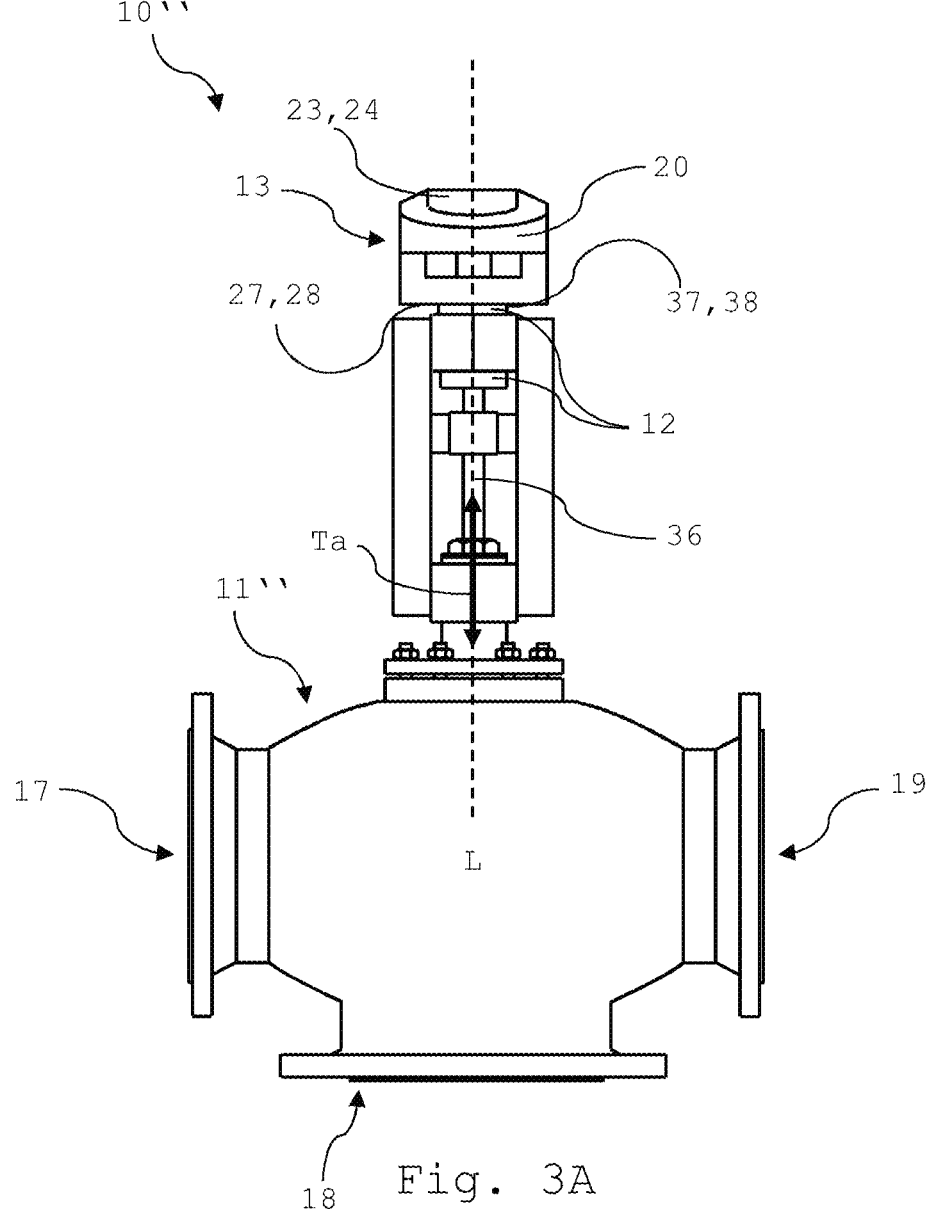
FIGS. 3A-3C is a schematic view of further examples of a valve drive system with different numbers of spring modules.
Figure 3B:
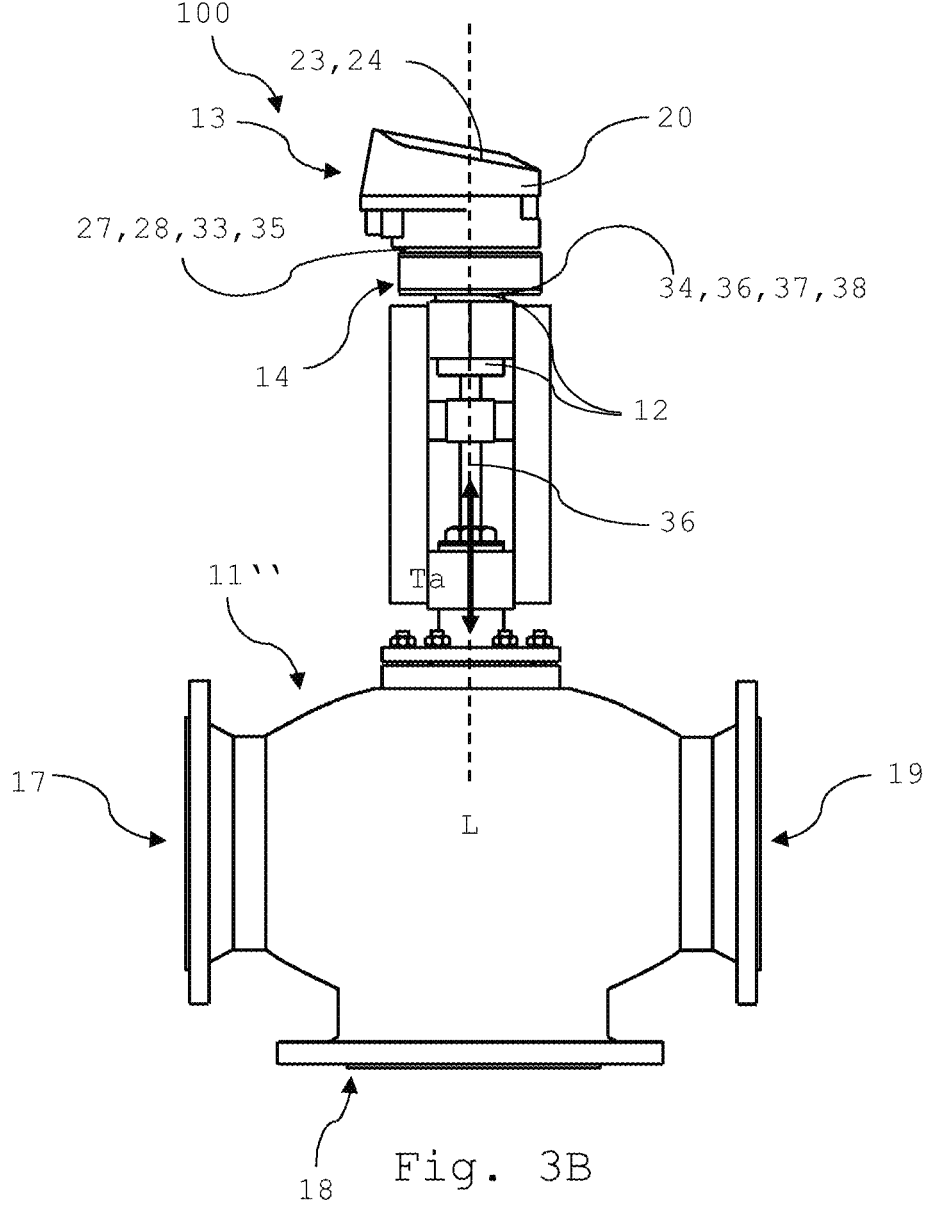
Figure 3C:
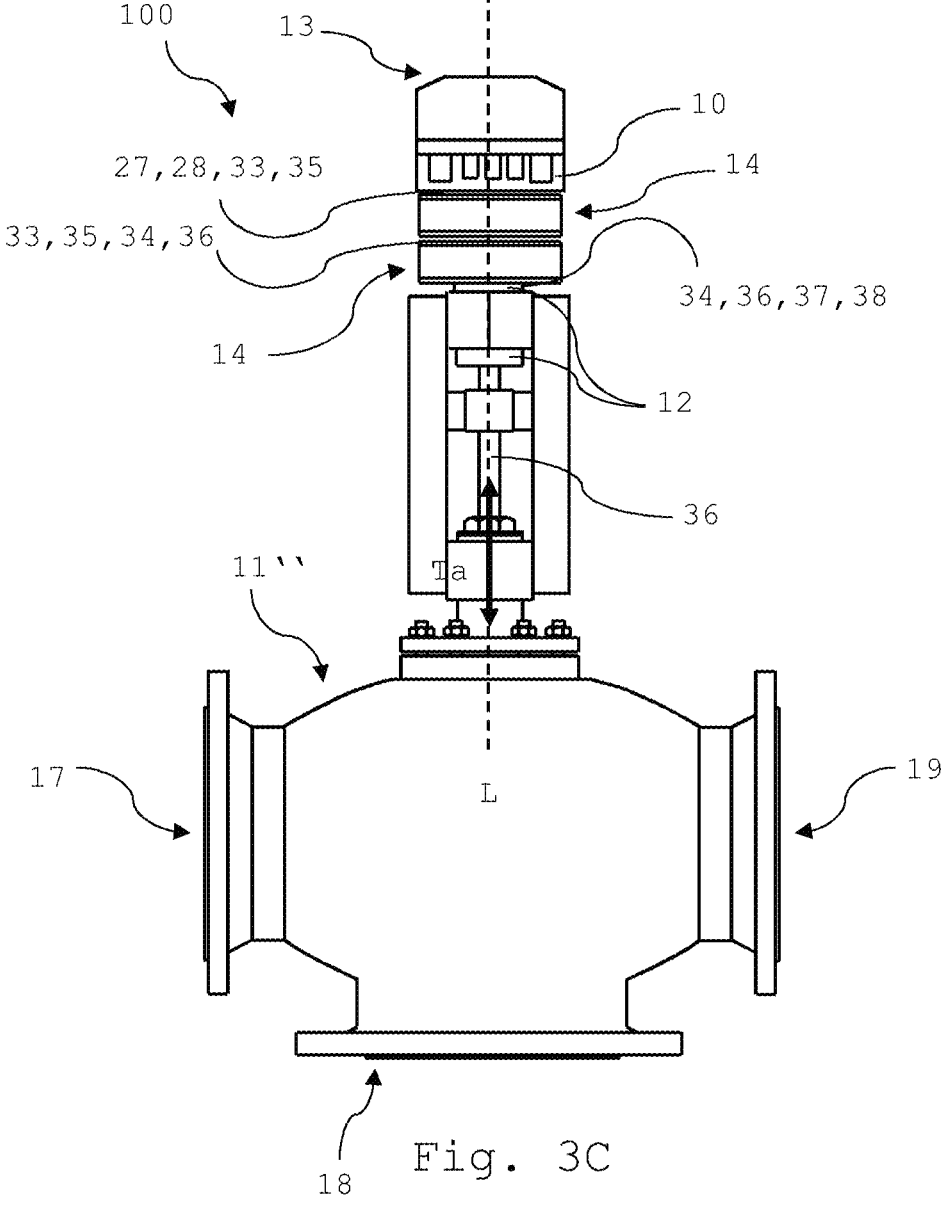

In the examples shown in FIGS. 3A to 3C, the valve 10" is also configured as a valve 10", whereby the 3-way valve 10" shown in FIGS. 3A to 3C is larger than the valve 10 shown in FIG. 1.

The modular valve drive system 10" shown in FIG. 3A has a drive module 13 with a drive module housing 20 and a linear drive module 12 with a linear drive module housing. A module interface 28 of the drive module 13 is arranged on a bottom 27 of the drive module housing 20, at which the drive module 13 is connected to a module interface 38 of the linear drive module 12 arranged on the top 37 of the linear drive module 12.

FIG. 3B shows a further example of the valve drive system 10" shown in FIG. 3A. In this example, a spring module 14 with a spring module housing 32 is mounted between the drive module 13 and the linear drive module 12. A module interface 35 is shown on a top 33 of the spring module housing 32, with which the spring module housing 32 is connected to the bottom 27 of the drive module housing 20. A module interface 36 is correspondingly provided on the bottom 34 of the spring module housing 32, which is connected to the module interface 38 on the top 37 of the linear drive module 12.

The valve drive modules 12, 13, 14 are fastened to the valve drive modules 12, 13 or 14 located above them by means of threaded screws, the shafts of which are pushed from below through through-holes and engaged in threaded holes provided for this purpose on the bottom of the valve drive module 12, 13 or 14 located above them. Here, the drive module housing 20 is rotated by 90° about a longitudinal axis L compared to the example in FIG. 3A, so that the shafts pushed through the through-holes meet a threaded hole on the bottom of the valve drive module above.

FIG. 3C shows a further example of the modular valve drive system 10", in which a further spring module 14 is mounted between the spring module 14 and the linear drive module 12. In the example shown in FIG. 3C, the drive module housing 20 is rotated by a further 90° around the longitudinal axis L compared to the example shown in FIG. 3B. Spring elements whose spring torques FT act in parallel are arranged in each of the spring modules 14. The spring elements are configured as roller springs, for example.

Figure 4:
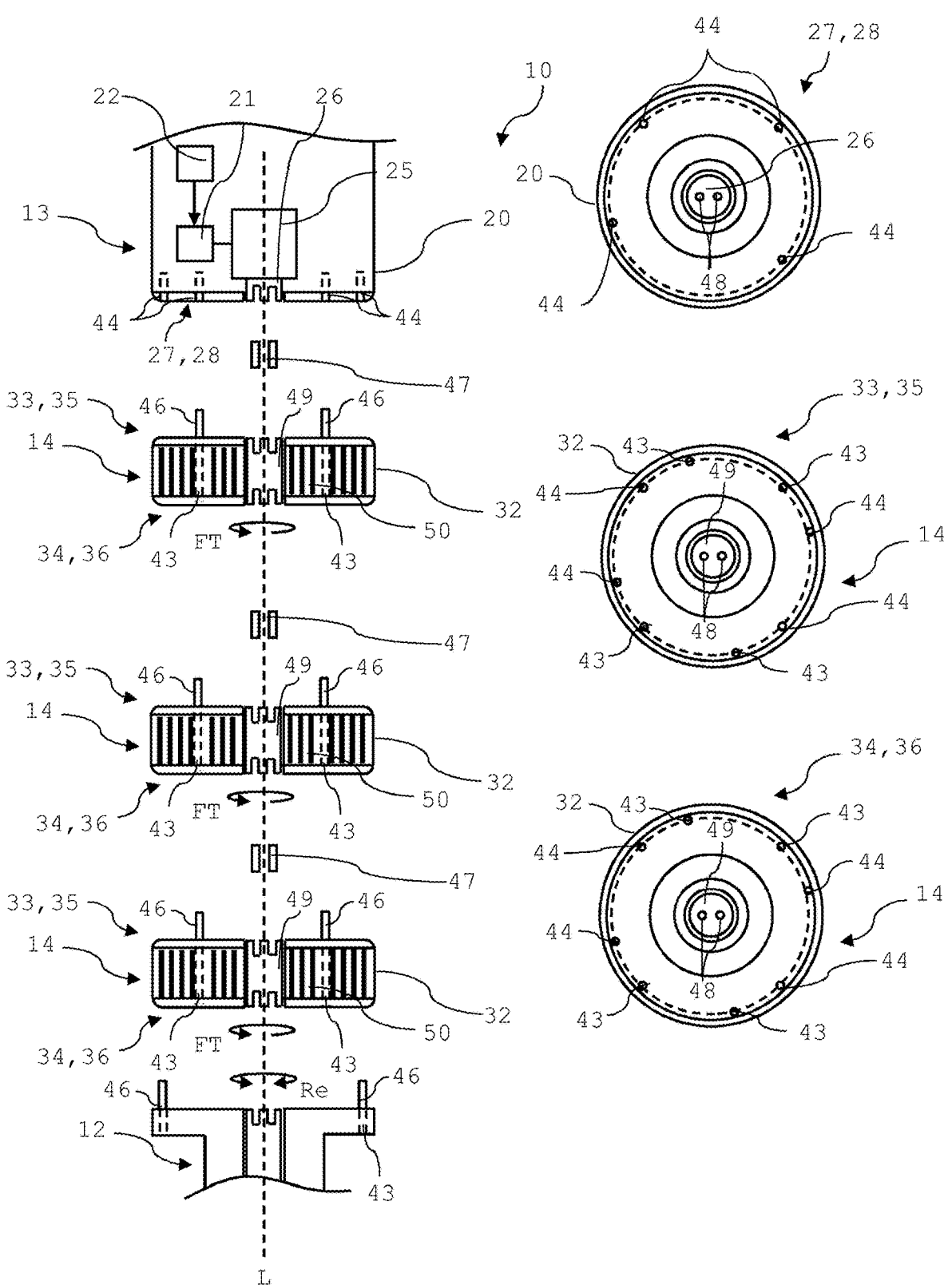
FIG. 4 is a schematic view of the structure of the valve drive system.

FIG. 4 illustrates how a valve drive system 10 is assembled and mounted from several valve drive modules 12, 13, 14. FIG. 4 shows an example of the drive module 13, three feeder modules 14 and a linear drive module 12 assembled to form a valve drive system 10. The left-hand side of FIG. 4 shows a schematic cross-section of the valve drive modules 12, 13, 14, while the right-hand side of FIG. 4 shows the corresponding top and bottom views of the upper and bottoms of the valve drive modules 13 and 14.

The drive module 13 has a drive module housing 20, in which an electric actuator motor 21 with a module-internal rotary transmission 25 and a module-internal controller 22 are accommodated, wherein the controller 22 is communicatively connected to the operating unit 24. The controller 22 is connected to the electric actuator motor 21 and is configured to control the electric actuator motor 21 in such a way that, for example, the valve 11, 11' or 11" is opened, closed and/or a desired actuating position of the actuator of the valve 11, 11' or 11" is set.

A module interface 28 is provided on the bottom 27 of the drive module housing 20. The module interface 28 of the drive module 12 has a plurality of threaded holes 44.

The spring module housings 32 have at least substantially the same structure.

Module interfaces 35 with a plurality of through holes 43 and a plurality of threaded holes 44 are arranged on the tops 33 of the spring module housings 32. The through holes 43 extend from the top 33 to the bottom 34 of the spring module housings 32 parallel to the longitudinal axis L.

The through holes 43 and threaded holes 44 are arranged in a pattern. The pattern in FIG. 4 is a circle that is arranged around a longitudinal axis L. The through holes 43 and threaded holes are arranged on the circle of the pattern. In the example shown in FIG. 4, four through holes 43 and four threaded holes 44 are arranged on the outer circle. In the simplest case, however, two through-holes 43 and two threaded holes 44 can be used to connect the valve drive modules 12, 13, 14 to each other in a rotationally fixed manner, so that torque transmission can take place between the valve drive modules.

The individual module interfaces 28, 35, 36 and 38 on the upper and lower sides of the module housings are arranged in such a way that they are aligned one above the other when the individual housings are stacked on top of each other. The valve drive modules 12, 13, 14 can thus be assembled and mounted to form a valve drive system as required. Four threaded holes 44 are arranged on the bottom 27 of the drive module housing 20. Thus, four threaded screws 45 can be inserted (from below) through the through-holes 43 of the top spring module 14 so that the shaft 46 of the threaded screws 45 protrudes from the top 33 of the spring module housing 32 and can be engaged with the threaded holes 44 in the bottom 27 of the drive module housing 20. The uppermost spring module 14 can thus be clamped against the drive module housing 20 and fastened to it. Using the same principle, the two other spring module housings 32 of the other spring modules 14 can be fastened (from below) to the bottoms 34 of the housings located above them using threaded screws 45.

The drive module 13 has a shaft coupling 26, with which the output shaft of the module-internal rotary transmission 25 can be connected in a motion-coupled manner to the input shaft (shown in FIG. 5) of an underlying valve drive module 13, 14, 15, 16 of the modular drive system. Coupling elements 47 are provided between the individual valve drive modules for the motion coupling.

In FIG. 4, the shaft coupling 26 of the drive module 12 has a coupling pocket 48 into which one or more coupling elements 47 can be inserted.

The spring module 14 arranged below the drive module 12 has a connecting shaft 49, which has a coupling pocket 48 on the top 33 of the spring module housing 32, into which one or more coupling elements 47 can be inserted. A spring element 50 is arranged in the spring module housing 32. The spring element 50 is a roller spring, the spring torque of which acts on the connecting shaft 49 in a predetermined direction of rotation (counterclockwise). On the bottom 34 of the spring module housing 32, the connection shaft 49 also has a coupling pocket into which one or more coupling elements 47 can be inserted, which couple the connecting shaft 49 of the spring module 14 with an input shaft of a subsequent module.

In the example shown in FIG. 4, the spring torque FT of the spring modules 14 acts counterclockwise, as shown by the arrow in FIG. 4. FIG. 4 also shows a further spring module 14, which is stacked with the other modules in the manner described above. The individual connecting shafts 49 of the spring modules 14 are motion-coupled to one another via the coupling elements 47 acting as shaft couplings, so that the spring torques FT of the spring modules 14 act parallel to one another.

In FIG. 4, the coupling elements 47 are pins. The coupling pockets in the input or output shafts of the individual modules are correspondingly adapted to the coupling elements. Instead of the pin-shaped coupling elements 47, however, coupling elements 47 of a different shape can also be used, which are suitable for transmitting the torque of one shaft to another shaft. For example, elements with rectangular, hexagonal, pentagonal, heptagonal, octagonal or star-shaped cross-sections can be used for this purpose.

Since the upper and lower bottoms 33 and 34 of the spring module housings 32 have an identical structure, the spring modules 14 can also be turned so that the spring torques FT of the spring elements 47 act, for example, in a clockwise direction (clockwise rotation). In this way, the safety position into which the actuators of the valve 11, 11' or 11" are brought by the spring modules 14 can be adapted and changed to the valve 11, 11' or 11" and depending on the position of the system at which the valve 11, 11' or 11" is installed. In some valves 11, 11' or 11", the safety position can mean a full closed valve, while in other valves 11, 11' or 11", the safety position can mean a fully open actuator, for example.

In FIG. 4, the spring module 14 is connected to the linear drive module 12 on its bottom 34.

Figure 5:
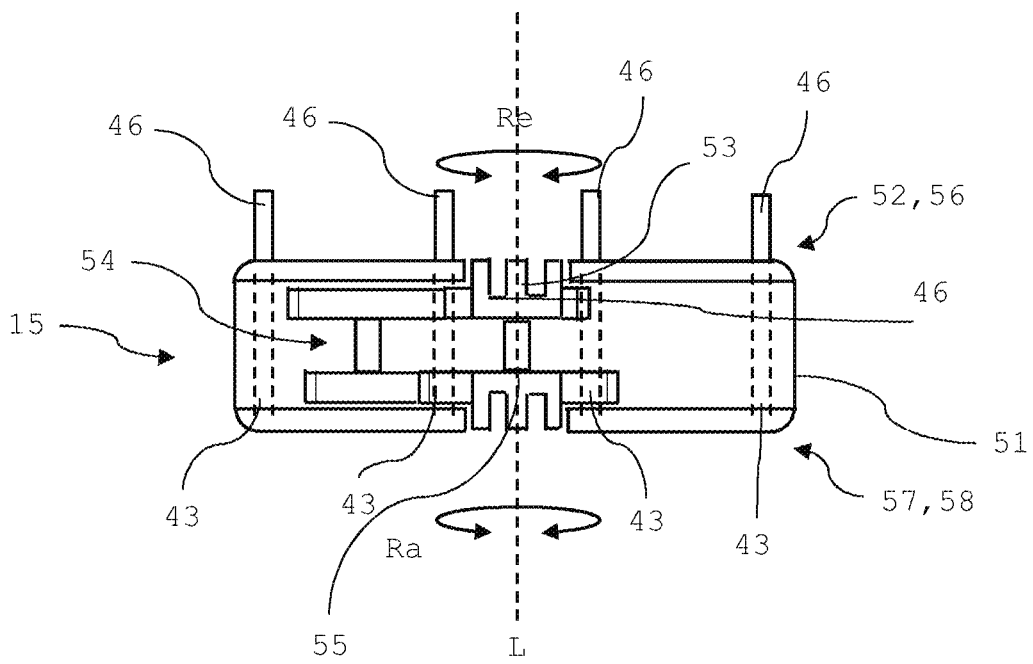
FIG. 5 is a detailed view of the rotary transmission module of the valve drive system according to the present disclosure.

FIG. 5 shows a rotary transmission module 15 having an input shaft 53 on the top 52 of the rotary transmission module housing 51, which is provided with a coupling pocket 48 (shown in FIG. 4) into which a coupling element 47 can be inserted. The coupling element 47 transmits a rotary movement to the rotary transmission module 15. The rotary transmission module 15 houses a rotary gear 54, which converts an input-side rotary movement Re into an output-side rotary movement Ra. The output-side rotary movement Ra is applied to the output-side rotary transmission module shaft 55 of the rotary transmission module 15. The output-side rotary transmission module shaft 55 of the rotary transmission module 15 has a coupling pocket, into which a coupling element 47 can in turn be inserted. The coupling element 47 transmits the output-side rotary movement Ra to a subsequent module.

The modular drive system according to the present disclosure, comprising valve drive modules 12, 13, 14, 15, 16, is used for assembling a modular valve drive system 10, 10', 10". The valve drive modules 12, 13, 14, 15, 16 of the modular drive system according to the present disclosure can be variably connected to one another via their module interfaces 28, 35, 36, 38 to form a valve drive system 10, 10', 10". The module housings 11, 21, 31, 41 of the valve drive modules 10, 20, 30, 40 contain the respective functional units separately from one another, which simplifies the assembly. The modular drive system according to the present disclosure comprises an electric drive module 13 with an drive module housing 20, on the bottom 27 of which a module interface 28 is arranged; and a drive module which can be attached to a valve and which is configured to convert the input-side rotary movement into an output-side movement with which the valve can be actuated, wherein the valve drive modules 12, 13, 14, 15, 16 can be connected to one another via their module interfaces 28, 35, 36, 38 to form a valve drive system.

<div style="text-align:center">REFERENCE SIGNS</div>

10, 10',10" valve drive system
11, 11',11" different valves (small valve, large valve, flap)
12 linear drive module
13 drive module
14 spring module
15 rotary transmission module
16 swivel module
17 A-inlet
18 B-inlet
19 AB-outlet
20 drive module housing
21 actuator motor
22 control unit (inside the module)
23 top of the drive module
24 control unit
25 rotary transmission of the drive module (inside the module)
26 shaft coupling of the drive module
27 bottom of the drive module housing
28 module interface of the drive module
29 stand module
30 coupling of the linear drive module
31 valve spindel
32 spring module housing
33 top of the spring module housing
34 bottom of the spring module housing
35 module interface of the top side of the spring module housing
36 module interface of the bottom of the spring module housing
37 top of the linear drive module housing
38 module interface of the linear drive module
39 swivel module housing
40 top of the swivel module housing
41 module interface of the swivel module
42 head of the threaded screws
43 through holes
44 threaded holes
45 threaded screws
46 shaft of the threaded screws
47 coupling elements
48 coupling pocket
49 connecting shaft
50 spring element
51 rotary transmission module housing
52 top side of the rotary transmission module housing
53 input shaft of the rotary transmission module
54 rotary transmission (inside the module)
55 shaft of the rotary transmission module
57 bottom of the rotary transmission module
58 module interface of the rotary transmission module
59 hand lever
60 top of the swivel module housing
62 swivel module housing
63 bottom of the swivel module housing
FT spring torque of the spring module L longitudinal axis
Re rotational movement of the input side
Ra rotational movement of the output side
Ta stroke movement on the output side
What is claimed is:

1. A modular drive system comprising valve drive modules for assembling a valve drive system, comprising:
an electric drive module with a drive module housing, on a bottom of which a module interface is arranged;
an actuating module which is attachable to a valve and is configured to convert an input-side rotary movement into an outside movement with which the valve can be actuated,
wherein the valve drive modules are connectable to one another via module interfaces of the valve drive modules to form a valve drive system;
wherein the valve drive modules have at least one spring module with a spring module housing, the spring module housing having a module interface arranged on a top and a bottom of the spring module housing;
wherein the spring module housing of the at least one spring module encloses a spring element accommodated in the at least one spring module;
wherein the spring element is configured to allow a spring torque to act on a connecting shaft in such a way that the connecting shaft is preloaded in a spring direction;
wherein the modular drive system has a plurality of spring modules with uniformly defined spring torques, which can be stacked in such a way that the uniformly defined spring torques act parallel to one another on an input shaft of the actuating module;
further comprising a rotary transmission module with a rotary transmission module housing, the rotary transmission module housing having module interfaces arranged on a top and a bottom of the rotary transmission module housing, the rotary transmission module being configured to convert an input-side rotary movement into an output-side rotary movement, the output-side rotary movement being geared down or geared up to the input-side rotary movement.

2. The modular drive system according to claim 1, wherein the valve drive modules each have shaft couplings, with which respective shafts of two valve drive modules of the valve drive modules can be coupled to one another.

3. The modular drive system according to claim 1, wherein the module interfaces of the at least one spring module are configured to be connected to module interfaces of other spring modules or to module interfaces of another one of the valve drive modules.

4. The modular drive system according to claim 1, wherein the at least one spring module comprises a connecting shaft.

5. The modular drive system according to claim 1, wherein the module interfaces of the valve drive modules have through-holes, which extend from a top to a bottom of housings of valve drive modules.

6. The modular drive system according to claim 1, wherein the module interfaces of the valve drive modules have threaded holes which are arranged on uppers and bottoms of housings of the valve drive modules.

7. The modular drive system according to claim 1, further comprising a rotary transmission module with a rotary transmission module housing, the rotary transmission module housing having module interfaces arranged on a top and a bottom of the rotary transmission module housing, the rotary transmission module being configured to convert an input-side rotary movement into an output-side rotary movement, the output-side rotary movement being geared down or geared up to the input-side rotary movement.

8. The modular drive system according to claim 1, wherein the valve drive modules of the modular drive system have a linear drive module with a linear drive module housing, linear drive module housing having a module interface arranged on a top of the linear drive module housing, the linear drive module being configured to convert an input-side rotary movement into an output-side stroke movement, with which the valve is actuated.

9. The modular drive system according to claim 1, wherein the valve drive modules of the modular drive system comprise a swivel module with a swivel module housing, the swivel module housing having a module interface arranged on a top of the swivel module housing, the swivel module being configured to convert an input-side rotary movement from the top of the swivel module housing into an output-side swivel movement for actuating the valve.

10. The modular drive system according to claim 1, wherein dimensions and arrangements of module interfaces provided on uppers and bottoms of housings of the valve drive modules are adapted to one another in such a way that the module interfaces are selectively connectable to one another.

11. A valve drive system which is assembled from a plurality of valve drive modules of the modular drive system according to claim 1.

12. The modular drive system according to claim 1, wherein the valve drive modules each have shaft couplings, with which shafts of valve drive modules can be coupled to one another.

13. The modular drive system according to claim 12, wherein the module interfaces of the at least one spring module can be connected selectively to module interfaces of other spring modules or to module interfaces of another one of the valve drive modules.

14. The modular drive system according to claim 13, wherein the spring module housing of the at least one spring module encloses a spring element accommodated in the at least one spring module.

15. The modular drive system according to claim 14, wherein the at least one spring module comprises a connecting shaft.

16. A modular drive system comprising valve drive modules for assembling a valve drive system, comprising:

an electric drive module with a drive module housing, on a bottom of which a module interface is arranged;

an actuating module which is attachable to a valve and is configured to convert an input-side rotary movement into an outside movement with which the valve can be actuated, wherein the valve drive modules are connectable to one another via module interfaces of the valve drive modules to form a valve drive system;

wherein the valve drive modules have at least one spring module with a spring module housing, the spring module housing having a module interface arranged on a top and a bottom of the spring module housing;

wherein the module interface arranged on the bottom of the spring module housing of one of the valve drive modules is connected to the module interface arranged on the bottom of the spring module housing of another one of the valve drive modules of the modular drive system and, correspondingly, the module interface arranged on the top of the spring module housing of one of the valve drive modules is connectable to the module interface arranged on the top of the spring module housing of other ones of the valve drive modules of the modular drive system in such a way that the at least one spring module is installed upside down.

17. The modular drive system according to claim 16, wherein the spring module housing of the at least one spring module encloses a spring element accommodated in the at least one spring module.

18. The modular drive system according to claim 17, wherein the spring element is configured to allow a spring torque to act on a connecting shaft in such a way that the connecting shaft is preloaded in a spring direction.

19. The modular drive system according to claim 18, wherein the modular drive system has a plurality of spring modules with uniformly defined spring torques, which can be stacked in such a way that the uniformly defined spring torques act parallel to one another on an input shaft of the actuating module.

\* \* \* \* \*